(12) United States Patent
Frauen et al.

(10) Patent No.: US 8,468,699 B2
(45) Date of Patent: Jun. 25, 2013

(54) METHOD FOR PRODUCING A FUSELAGE CELL OF AN AIRCRAFT

(75) Inventors: Holger Frauen, Hamburg (DE); Dirk Gross, Stade (DE); Oliver Kraatz, Weyhe (DE); Eckart Frankenberger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 775 days.

(21) Appl. No.: 12/085,268

(22) PCT Filed: Nov. 15, 2006

(86) PCT No.: PCT/EP2006/068496
§ 371 (c)(1),
(2), (4) Date: Oct. 18, 2009

(87) PCT Pub. No.: WO2007/057411
PCT Pub. Date: May 24, 2007

(65) Prior Publication Data
US 2010/0031509 A1    Feb. 11, 2010

(30) Foreign Application Priority Data
Nov. 17, 2005    (DE) .......................... 10 2005 054 869

(51) Int. Cl.
*B21D 53/88*    (2006.01)
(52) U.S. Cl.
USPC ...................................................... 29/897.2
(58) Field of Classification Search
USPC ...................................................... 29/897.2
See application file for complete search history.

(56) References Cited

U.S. PATENT DOCUMENTS

| 2,374,894 | A | 5/1945 | Pioch |
| 4,479,621 | A | 10/1984 | Bergholz |
| 4,674,712 | A | 6/1987 | Whitener et al. |
| 2001/0054228 | A1 | 12/2001 | Lehmker et al. |
| 2006/0231681 | A1 | 10/2006 | Huber et al. |

FOREIGN PATENT DOCUMENTS

| DE | 10339507 | 3/2005 |
| JP | 58078895 | 5/1983 |
| RU | 2121452 | 11/1998 |
| SU | 1655071 | 10/1995 |

OTHER PUBLICATIONS

International Search Report and Written Opinion dated Apr. 12, 2007.
International Written Opinion for International Serial Application No. PCT/EP2006/068496 dated May 20, 2008.
International Search Report for International Serial Application No. PCT/EP2006/068496 dated Apr. 12, 2007.
Russian Decision to Grant for Application No. 2008118064/11 dated Nov. 15, 2006.

*Primary Examiner* — David Bryant
*Assistant Examiner* — Moshie Wilensky
(74) *Attorney, Agent, or Firm* — Jenkins, Wilson, Taylor & Hunt, P.A.

(57) ABSTRACT

The invention relates to a method for producing at least one fuselage cell of an aircraft with the following steps: at least partial production of surface protection and thermal insulation in the region of the at least one shell part, at least partial introduction of technical outfitting systems 1-3, 10-12, 22-24, 46-48, in particular of electrical and hydraulic lines, air-conditioning lines, electrical and hydraulic appliances, sanitary and catering equipment or the like, into the at least one shell part and/or the at least one floor grid 13, 41, and assembly of the at least one shell part and of the at least one floor grid 13, 41 into the at least one fuselage section 32.

12 Claims, 3 Drawing Sheets

METHOD FOR PRODUCING A FUSELAGE CELL OF AN AIRCRAFT

TECHNICAL FIELD

The invention relates to a method for producing a fuselage cell of an aircraft by integrated outfitting and structural assembly with at least one fuselage section, the fuselage section being formed by at least one shell part, in particular by an upper shell and by a lower shell, and also by at least one floor grid.

BACKGROUND

In known methods for producing fuselage cells for aircraft, first, shell parts and the floor grid are assembled to form an essentially annular fuselage section with a relatively small length dimension, for example of up to 8 m, by means of the closing of the longitudinal seams. Subsequently, the mountings required for the technical line systems are attached at least partially in the fuselage section. Thereafter, a plurality of fuselage sections are aligned with one another to form longer fuselage portions and are connected to one another by means of the closing of the transverse seams. Finally, outfitting assembly takes place, in which a multiplicity of technical systems are introduced into the fuselage section. These may be, for example, thermal insulation, hydraulic, electrical and air-conditioning lines and further technical devices or appliances. Before outfitting assembly, as a rule, the production or application of surface protection is carried out. In this case, inter alia, the longitudinal and transverse seams are subjected to surface protection treatment.

Particularly the installation of the technical systems into the fuselage sections is complicated in the known methods, since, for example, a multiplicity of clumsy pipelines have to be introduced into the fuselage section which is closed along its, for example, essentially circular circumferential contour. In particular, the maximum handlable lengths of the pipelines and of the further lines limit the length of the already closed fuselage section to be fitted out with the technical systems. Moreover, during this operation, no heavy/complex manufacturing aids, such as, for example, lifting devices, handling systems, scaffolds or the like, can be used, since, for example, the floor grid should not be exposed to any increased mechanical loads. Furthermore, a multiplicity of technical outfitting systems have to be installed in the fuselage section in unfavourable working positions, for example overhead in the case of the air-conditioning lines, this being ineffective in ergonomic and economic terms. Finally, due to the hitherto relatively small length dimensions and to the confined installation conditions on account of a multiplicity of floor supporting bars, etc. in the individual fuselage sections, a multiplicity of weight-increasing connection points occur in the case of the technical line systems, after the fuselage sections have been assembled into longer fuselage portions, and also increase the probability of technical malfunctions.

SUMMARY

The object of the invention is largely to avoid the above-mentioned disadvantages of the known manufacturing methods for producing fuselage cells with fuselage sections of aircraft.

This object can be achieved by methods disclosed and described herein.

The method according to the invention for producing a fuselage cell of an aircraft by integrated outfitting and structural assembly with at least one fuselage section, the fuselage section being formed by at least one shell part, in particular by an upper shell and by a lower shell, and also by at least one floor grid, in this comprises the steps:

at least partial production of surface protection and thermal insulation in the region of the at least one shell part, at least partial introduction of technical outfitting systems, in particular of electrical and hydraulic lines, air-conditioning lines, electrical and hydraulic appliances, sanitary and catering equipment or the like, into the at least one shell part and/or the at least one floor grid, and assembly of the at least one shell part and of the at least one floor grid into the at least one fuselage section.

The introduction of the technical outfitting systems into the at least one shell part and/or the at least one floor grid before their assembly into a fuselage section makes it possible, inter alia because of better accessibility, to make the length dimensions of the at least one shell part and/or of the floor grid relatively large, easy incorporation into the manufacturing process nevertheless being possible.

Furthermore, in the method according to the invention, complicated manufacturing aids, for example in the form of automatic or manual handling appliances, work platforms, scaffolds, lifting devices and the like, can be used, which can no longer be employed in a fuselage section having an already closed circumferential contour.

Furthermore, the shell parts and the floor grid which are to be provided with the technical outfitting systems can be brought by means of suitable positioning members into a position on a fixed base, particularly suitable for introducing the technical outfitting systems, and can be machined simultaneously.

On account of the relatively large length dimensions of the technical outfitting systems, for example in the form of freshwater and sewage lines, hydraulic lines, air-conditioning lines, supply-air and spent-air lines, electrical control and supply lines and optical control lines, and of the assembly accessibility which is improved according to the invention, the number of connection points is reduced, so that, when the method according to the invention is employed, a significant weight reduction, along with an at the same time diminished susceptibility to faults, is obtained. Furthermore, the outlay in terms of maintenance required for ensuring fault-free operation is also reduced.

Moreover, the preferably larger length dimensions of the fuselage sections formed from the shell parts and the floor grid make it possible to reduce the number of transverse seams required. This results, in turn, in a weight reduction, a saving of work time and a decrease in transit time through the overall manufacturing process.

After the at least partial outfitting of the preferably at least two shell parts has taken place, the shell parts are connected to one another, so that a fuselage section with a closed, for example essentially circular circumferential contour is obtained. The installation of the at least one floor grid takes place at the same time. The preferably at least two shell parts are connected along their longitudinal sides by means of longitudinal seams, for example by means of known riveting, welding and adhesive bonding methods, to form a closed fuselage section. Finally, surface protection can be carried out in the region of the fuselage section, particularly in the region of the newly made longitudinal and trans-verse seams.

The method according to the invention may also be employed in the case of "monocoque" or closed fuselage sections, in which case, for example, preferably a fully pre-outfitted floor grid is introduced into the fuselage section in order to simplify manufacture. Fuselage sections of this type which are not composed of at least two shell parts are produced, for example, in one piece (seamlessly) by the winding method (for example, from a carbon-fibre-reinforced plastic) or by bending together or rolling together large-format panel portions (for example, aluminium sheets), the panels being connected in the region of the two longitudinal sides by means of a longitudinal seam in order to form a closed fuselage section.

The method according to the invention is suitable particularly for the manufacture of fuselage cells of larger passenger aircraft which have a capacity of more than 100 seats. The method may also be employed correspondingly for the manufacture of fuselage cells for larger transport aircraft which have a MTOW (maximum take-off weight) of more than 50 t.

An advantageous embodiment of the invention provides for the at least one fuselage section to have a length of at most 30 m.

On account of the relatively large length dimensions of up to 30 m of the shell parts used for forming the at least one fuselage section and of the at least one floor grid, the number of necessary connection points of the technical outfitting and line systems, for example in the form of hydraulic lines, electrical control and supply lines and fresh-water and sewage lines, and the number of required transverse seams for forming the finished fuselage cell from the fuselage sections can be reduced significantly.

The maximum possible length of the shell parts or of the at least one fuselage section and of the at least one floor grid is in this case limited essentially only by the available transport means, for example in the form of heavy goods vehicles, air transport means, water transport means or the like. In a development of the method according to the invention, there is provision, to complete the fuselage assembly, for at least one fuselage portion of the aircraft, in particular a front, middle and rear fuselage portion, to be formed by at least one fuselage section, the fuselage cell of the aircraft having at least one fuselage portion.

The relatively large length dimensions of the fuselage sections used for forming the individual fuselage portions of the aircraft make it possible, inter alia, considerably to reduce the number of transverse seams required between the fuselage sections fitted out at least partially with the technical systems, during fuselage assembly, that is to say during the final assembly of the fuselage cell of the overall aircraft from the fuselage sections, so that the outlay in terms of time and consequently the manufacturing costs can be reduced. At the same time, the number of fuselage sections still required for forming the complete fuselage cell decreases. To complete a fuselage cell, for example, in each case two or more fuselage sections are aligned one behind the other and connected to one another to form a front, a middle and a rear fuselage portion. The fuselage portions then together form the finished fuselage cell of the aircraft. The fuselage sections are connected at their end regions along transverse seams by means of currently available connection methods or joining methods, for example by means of known riveting, welding, screwing, clamping or adhesive bonding methods. The same applies correspondingly to the connection of the three fuselage portions mentioned by way of example. In conclusion, once again, surface protection treatment can be carried out.

In principle, the fuselage cell may be formed by a single fuselage section or a single fuselage portion, so that the shell parts for forming the fuselage section have a length which corresponds approximately to the overall length of the aircraft.

Further advantageous embodiments of the method are set out in the further patent claims.

The sequence of the method according to the invention will be explained by means of FIGS. 1 to 4.

DETAILED DESCRIPTION

The diagrammatic sequence of the method according to the invention will be explained in more detail by the example of the "half-barrel type of construction", as it may be referred to, with reference to FIGS. 1 to 6.

Figure 1:
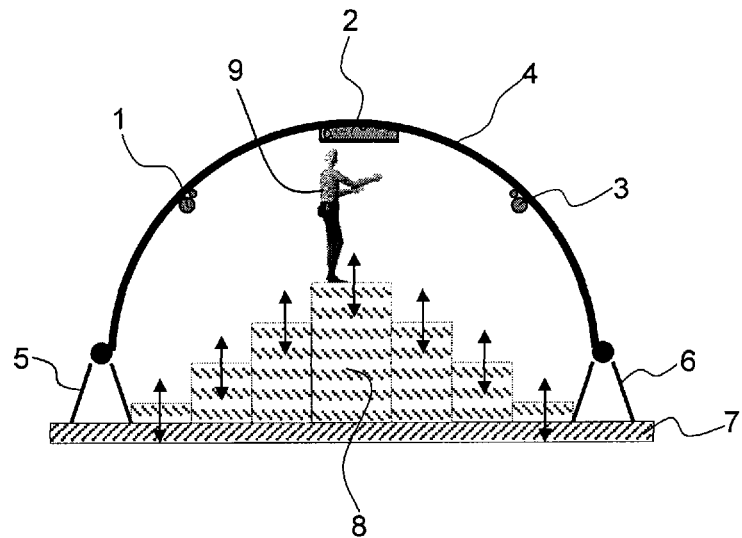
FIG. 1 shows the at least partial introduction of technical outfitting systems into an upper shell.

FIG. 1 shows the introduction of technical outfitting systems 1 to 3 into an upper shell 4. The technical outfitting systems 1 to 3 may be, for example, sewage and fresh-water lines, sanitary installations, air-conditioning lines, supply-air and spent-air lines, electrical supply lines, electrical and/or optical control lines, hydraulic lines, technical appliances, catering installations, complete catering and sanitary cells, cabin windows, lighting equipment, safety equipment, thermal insulations or the like. The upper shell 4 is in this case received in the mountings 5, 6 which, in turn, are propped up on the fixed base 7. To make it easier to assemble the technical outfitting systems 1 to 3, the upper shell 4 is "slipped over" a work platform 8. The work platform 8 is designed to be partially vertically adjustable, as indicated by the black double arrows. The work platform 8 enables an employee 9, in an ergonomically beneficial upright work posture, for example, to introduce the technical outfitting systems 1 to 3 into the upper shell 4 or mount them in the latter. In parallel with the introduction of the technical outfitting systems 1 to 3, the surface protection, for example in the form of a sealing of longitudinal or transverse seams between shell parts forming the upper shell 4, the introduction of thermal insulation or the like, can be carried out. Furthermore, it is possible virtually to "slip" the upper shell 4 over outfitting systems already arranged on the base 7, with the result that the assembly process can be further simplified, since the outfitting systems 1 to 3 no longer or only slightly have to be raised for mounting. The upper shell 4 may in this case be formed in one piece or by a plurality of composed shell parts. Contrary to the illustration of FIG. 1, the upper shell may also be rotated through 180° about its longitudinal axis, so that outfitting with the technical outfitting systems 1 to 3 can be carried out from above by means of suitable scaffolds or crossmembers.

Instead of the partially vertically adjustable work platform 8 shown, further manufacturing or assembly aids, for example automatic or manually actuable handling appliances for positioning and mounting the technical outfitting systems 1 to 3 or the like, may be provided.

The ergonomically advantageous working position of the employee 9 makes it possible, in particular, to provide upper shells 4 having large length dimensions, that is to say a larger longitudinal extent perpendicular to the drawing plane, with technical outfitting systems, since, inter alia, it is no longer necessary to introduce the technical outfitting systems 1 to 3 into a closed annular fuselage section. Furthermore, it is not necessary to mount the abovementioned outfitting systems 1 to 3, starting from a floor grid which is present in the fuselage section and, as a rule, does not have sufficient load-bearing capacity in mechanical terms. Instead, in the method according to the invention, the mounting of the outfitting systems 1 to 3 by means of the work platform 8 or other, possibly even heavy assembly aids, can always take place with support on the fixed base 7, so that, as a rule, there are no longer any weight or length restrictions of the technical outfitting systems 1 to 3 which, in the assembly methods previously known, lead, as a rule, to the length limitations in the technical outfitting systems 1 to 3 to be mounted. The length limitations required in assembly methods known previously result, as a rule, in an increased number of connection points, particularly in the case of technical lines, which generally lead to an increase in weight, to an increased probability of failure and to increased maintenance intensity.

By contrast, by means of the method according to the invention, the upper shell 4 having length dimensions considerably larger than those of conventional fuselage sections can be fitted out with the technical outfitting systems 1 to 3.

The larger the selected length dimensions of the respective fuselage sections are, the better the idea of the invention can be implemented, because as a result of this, inter alia, the number of transverse seams required is reduced or trans-verse seams are no longer necessary at all, since, in an extreme case, a section constitutes only a "long" fuselage portion. In addition, fuselage sections having as large length dimensions as possible can be fitted out more quickly with technical outfitting systems, since the number of connection points required is smaller.

In addition to the technical outfitting systems, the shell parts, which are assembled later preferably to form a fuselage section having a larger length dimension, can be provided with the interior outfitting intended for the aircraft, for example with the complete interior trims, luggage storage containers, lighting equipment, interior outfitting, catering and sanitary cells or the like. The same applies correspondingly to the pre-outfitting of the at least one floor grid.

Figure 2:
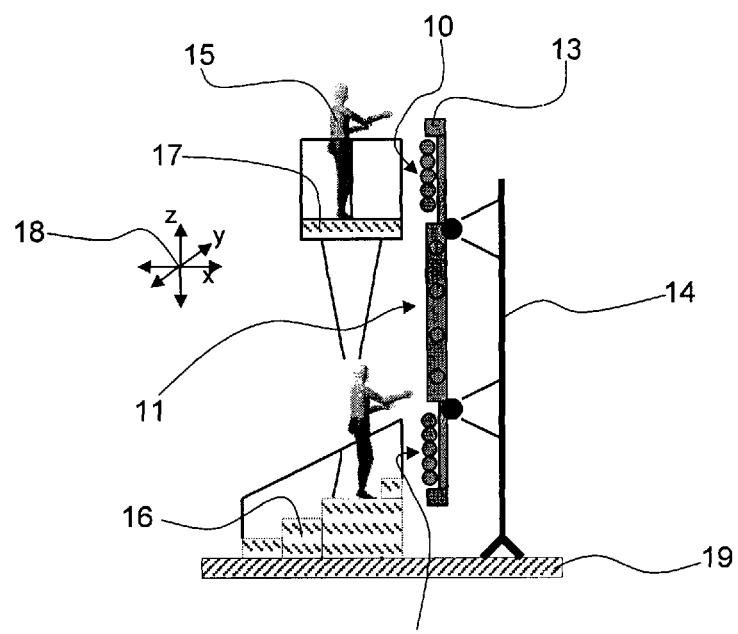
FIG. 2 shows the at least partial introduction of technical outfitting systems into a floor grid.

FIG. 2 shows the introduction of technical outfitting systems 10 to 12 into or onto a floor grid 13. As already stated within the framework of the description of FIG. 1, the technical outfitting systems 10 to 12 are, for example, air-conditioning lines, supply-air and spent-air lines, electrical supply lines, hydraulic lines, electrical and/or optical control lines, technical appliances, sanitary installations, catering installations, sanitary and catering cells, thermal insulations or the like. The floor grid 13 is in this case received on a suitable mounting 14. Preferably, the floor grid 13 is pivoted by means of the mounting 14 into an essentially vertical position which enables an employee 15, in an ergonomically favourable, that is to say, for example, standing position, to introduce the technical outfitting systems 10 to 12 into the floor grid 13 or mount them on the latter. The floor grid 13 may, if appropriate, also be pivoted into a position deviating from the vertical position with respect to the fixed base 19. For this purpose, the mounting 14 is designed to be pivotable at least in one spatial direction.

The employee 15 can in this case carry out the mounting of the technical outfitting systems 10 to 12 on and/or in the floor grid 13, for example, on a stair-shaped work platform 16 or on a lifting platform 17 which, as indicated by the coordinate system 18, can be positioned freely preferably in the x-, y-, and z-direction of space. Contrary to the stair-shaped work platform 16 and lifting platform 17 shown, once again, any desired assembly or manufacturing aids may be used. Furthermore, it is possible at least partially also to draw up at least partly automatic handling appliances, such as, for example, articulated-arm robots, gantry robots or the like, for positioning and/or mounting the technical outfitting systems 10 to 12 on the floor grid 13.

In accordance with the statements made within the framework of the description of FIG. 1, the floor grid 13, too, may have, according to the invention, a larger length, that is to say a larger longitudinal extent perpendicularly to the drawing plane, since, by means of the work platform 16 or the lifting platform 17, it is also possible to mount longer technical outfitting systems, for example in the form of pipelines or the like.

Both the mounting 14 and the work platform 16 and also the lifting platform 17 are arranged on a fixed base 19. As a result, even heavy and, in particular, large-format clumsy technical outfitting systems 10 to 12, which, in particular, have a large longitudinal extent perpendicularly to the drawing plane, can be mounted on the floor grid 13. Furthermore, the floor grid 13, preferably positioned vertically during the mounting of the technical outfitting systems 10 to 12, affords very good accessibility, as compared with assembly methods known previously, in which, as a rule, it is necessary to introduce and mount at least parts of the technical outfitting systems in an annular fuselage section already closed on itself.

In parallel with the technical outfitting of the floor grid 13, corrosion protection can at least partially be introduced or applied in the region of the floor grid 13, with the result that a further time saving is possible.

Figure 3:
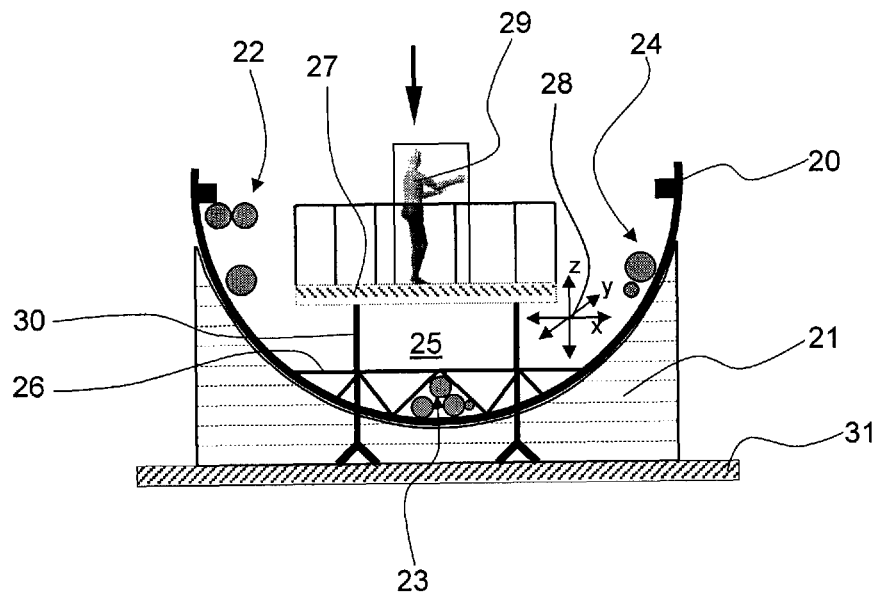
FIG. 3 shows the at least partial introduction of technical outfitting systems into a lower shell.

FIG. 3 shows, furthermore, the introduction of technical outfitting systems into a lower shell 20. The lower shell 20 rests on a carrying structure 21 which is adapted at least in regions to the surface geometry of the lower shell 20. The carrying structure 21 may be formed, for example, by wedge blocks, carrying straps or the like. Alternatively, movable rams for the adaptable reception of lower shells, in each case with different cross-sectional geometries, may be provided with one and the same carrying structure. In a lower region of the lower shell 20, a bottom scaffold 26 is introduced, which serves, inter alia, for guiding the technical outfitting systems 23 and for mechanical reinforcement. Furthermore, a work platform 27 is arranged inside the lower shell 20 and, as indicated by the coordinate system 28, can be positioned preferably in the x-, y- and z-direction of space. An employee 29 is located on the work platform 27 for carrying out assembly activities within the framework of the fitting-out of the lower shell 20 with the technical outfitting systems 22 to 24. The work platform 27 is propped up on a carrying scaffold 30 which is supported on a fixed base 31. The carrying structure 21 is also supported correspondingly on the fixed base 31.

Since both the lower shell 20 and the work platform 27 rest on the fixed base 31, heavy, large-format and, in particular, technical outfitting systems 22 to 24 having large length dimensions can be installed in the lower shell 20, the handling of which outfitting systems has to be controlled reliably, particularly in the case of the long shell parts according to the invention or the fuselage sections formed from these.

In the method according to the invention, in contrast to the sequential manufacturing methods known previously, the outfitting of the upper shell 4, of the floor grid 13 and of the lower shell 20 with the respective technical outfitting systems 1 to 3, 10 to 12 and 22 to 24 can take place simultaneously, that is to say in parallel, thus resulting in a considerable time saving. No mutual obstruction takes place during the introduction of the technical outfitting systems 1 to 3, 10 to 12 and 22 to 24. In parallel with the outfitting of the upper shell 4, of the floor grid 13 and of the lower shell 20, corrosion protection, in particular of the longitudinal and transverse seams, and the introduction of thermal insulation or the like can be carried out.

Figure 4:
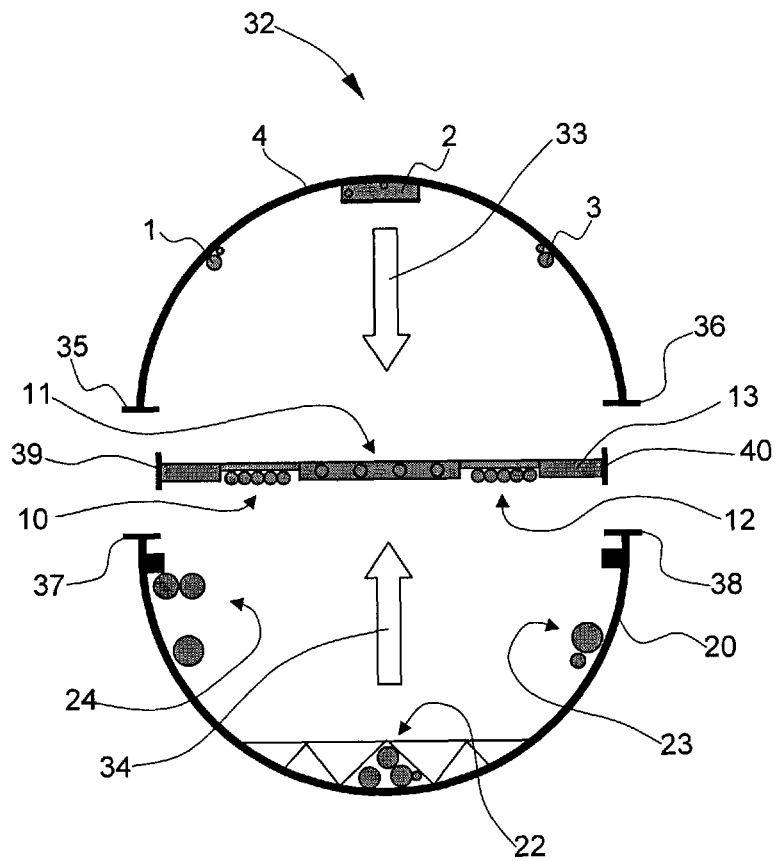
FIG. 4 shows the assembly of the pre-outfitted upper shell, of the floor grid and of the lower shell into a (preferably longer) fuselage section.

FIG. 4 illustrates diagrammatically how the upper shell 4, the floor grid 13 and the lower shell 20, which are fitted out at least partially with technical outfitting systems 1 to 3, are brought together in the direction of the arrows 33, 34 into a finished fuselage section 32 having the technical outfitting systems 1 to 3, 10 to 12 and 22 to 24. Since the assembly operations in terms of the installation of the technical outfitting systems are facilitated, as explained within the framework of the description of FIGS. 1 to 3, the fuselage section 32 can have markedly larger length dimensions, as compared with conventionally manufactured fuselage sections, with the result that the number of connection points required, particularly in the case of technical line systems, can be reduced.

Should the upper shell 4, the floor grid 13 and the lower shell 20 not yet be fitted out completely with technical systems, the section 32 can, if necessary, also be completed in full in this phase of the method. The same applies correspondingly to the possibly still required introduction or completion of surface protection and thermal insulation.

To form the fuselage section 32, the upper shell 4, the floor grid 13 and the lower shell 20 are firmly connected to one another in the region of longitudinal seams 35 to 40, for example, by riveting, welding or adhesive bonding.

To form a longer fuselage portion of a fuselage cell of an aircraft, for example a front, a middle or a rear fuselage portion, at least one, but preferably a plurality of fuselage sections, produced in accordance with the method outlined above, are connected to one another in the region of transverse seams which run essentially parallel to the drawing plane. Finally, the complete fuselage cell is formed, for example, by a rear, a middle and the front fuselage portion being assembled. Assembly may take place by means of conventional riveting or welding methods or by means of adhesive bonding methods.

Figure 5:
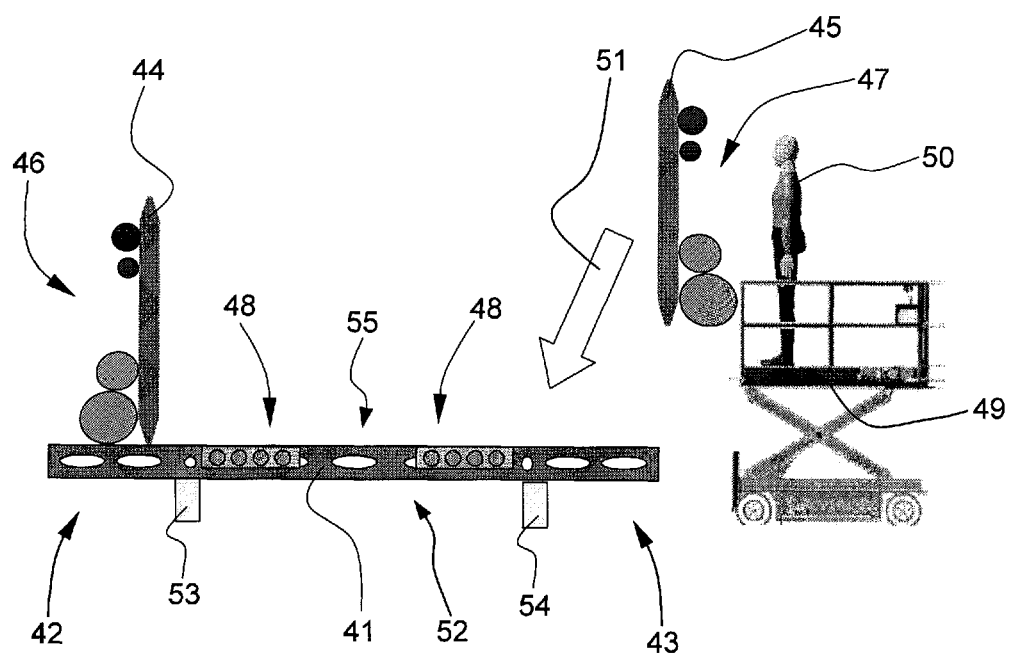
FIG. 5 shows the at least partial introduction of technical outfitting systems into a floor grid having floor supporting bars.

FIG. 5 shows the at least partial introduction of technical outfitting systems into a floor grid which has floor supporting bars (Samer bars, as they are known) for the mechanical reinforcement of the structure.

A floor grid 41 is provided in both edge regions 42, 43 with what are known as floor supporting bars 44, 45. The floor supporting bars 44, 45 serve for the additional connection of the floor grid 41 to a lower shell, not illustrated in FIG. 5. The floor supporting bars 44, 45 shown in this case represent a multiplicity of floor supporting bars which are spaced uniformly apart from one another in both edge regions 42, 43 and which are arranged over the entire length of the floor grid 41 (that is to say, perpendicularly to the drawing plane). Conventionally, the floor supporting bars have a mutual spacing of about 50 cm. The floor grid 41 has already been pre-outfitted in the run-up with some technical outfitting systems 48. Further technical outfitting systems 46, 47 are arranged on the floor supporting bars 44, 45 and are mounted on the floor supporting bars 44, 45 in a work step which is not illustrated. The technical outfitting systems 46 to 48 may again be, for example, air-conditioning lines, supply-air and spent-air lines, electrical supply lines, hydraulic lines, electrical and/or optical lines, technical appliances, sanitary installations, catering installations, sanitary and catering cells, thermal and/or acoustic insulations or the like. On account of easy accessibility in the premounting position of the floor grid 41, as shown, the technical outfitting systems 46 and 47 may even be mounted only after the positioning and fastening of the floor supporting bars 44, 45.

By means of a lifting platform 49 which, if appropriate, is provided with additional mounting devices, an employee 50 positions and fastens the floor supporting bars 45, including the outfitting systems 47 already arranged on them, on the floor grid 41 in the direction of the arrow 51. Correspondingly to the procedure outlined above, the floor supporting bar 44 having the technical outfitting systems 46 has been positioned and fastened on the floor grid 41. It becomes clear from the illustration of FIG. 5 that, inter alia, the method according to the invention greatly simplifies the mounting of the technical outfitting systems 46, 47 in the region of the floor supporting bars 44, 45, since the outfitting systems 46, 47, for example in the form of clumsy lines, no longer have to be "threaded through" behind floor supporting bars, but can instead be fastened in a simple way to the freely accessible floor supporting bars 44, 45, even in the case of large length dimensions. During the mounting of the floor supporting bars 44, 45 together with the technical outfitting systems 46, 47 arranged on them, a top side 52 of the floor grid 41 rests on the supports 53, 54, so that the mounting of the technical outfitting systems 46 to 48 is carried out from a then overhead underside 55 of the floor grid 41. This affords very good accessibility during the pre-outfitting process.

Figure 6:
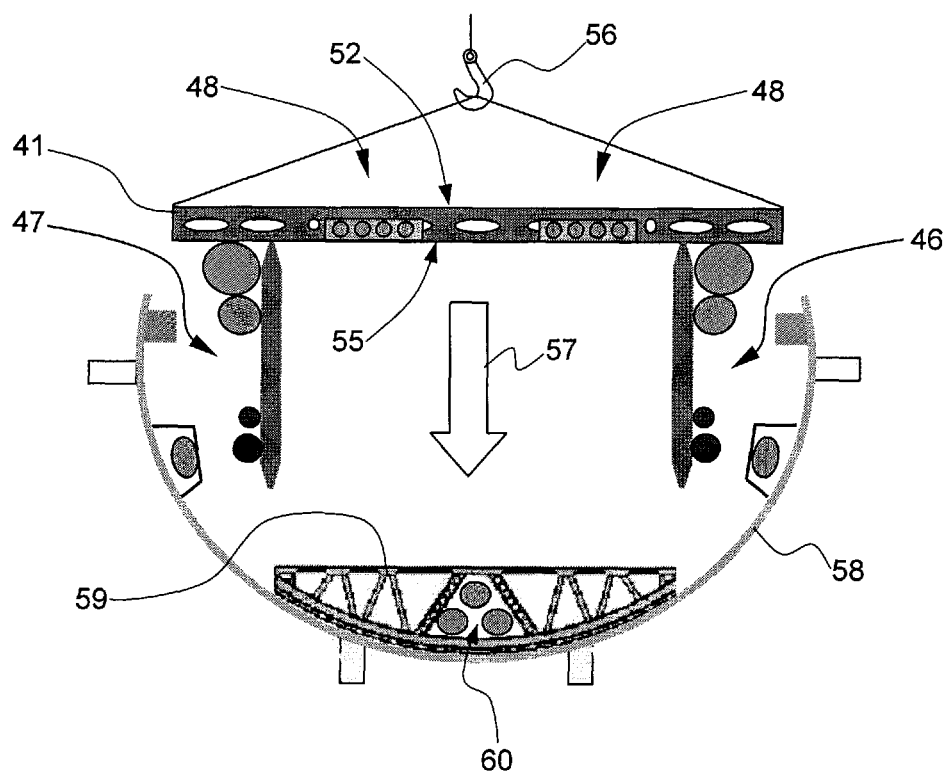
FIG. 6 shows the introduction of the pre-outfitted floor grid having the floor supporting bars into a lower shell.

FIG. 6 shows how, for final assembly, the floor grid 41 preassembled according to FIG. 5 with the technical outfitting systems 46, 47, 48 and the floor supporting bars 44, 45 is rotated through 180° with respect to a longitudinal axis (perpendicularly to the drawing plane), so that the underside 55 then points downwards and the top side 52 upwards again. Subsequently, by means of a lifting device 56 as a manufacturing aid, the floor grid 41 together with all the essential fittings is lowered in the direction of the arrow 57 into a lower shell 58. After the complete lowering of the floor grid 41, the edge regions 42, 43 of the floor grid 41 and the floor supporting bars 44, 45 are firmly connected to the lower shell 58.

Since the floor grid 41, with the underside 55 overhead, is provided with the technical outfitting systems 46 to 48 (cf. FIG. 5), there is good accessibility for introducing and mounting the technical outfitting systems 46 to 48. In a lower region of the lower shell 58, at least in regions, a cargo floor 59, as it is known, is arranged, which has itself already been provided with the required technical outfitting systems 60 before the introduction and fastening in the lower shell 58. The cargo floor 59 serves, in particular, as a storage area for cargo.

The method according to the invention is in this case not to be seen as being restricted to the manufacture shown in what is known as the half-barrel type of construction with an upper shell, a lower shell and a floor grid. Thus, the idea according to the invention may also be transferred, for example, to what is known as the quarter-barrel type of construction, in which an upper shell, a lower shell, a floor grid and two side shells form in each case a fuselage section. Contrary to the above-mentioned half-barrel type of construction and quarter-barrel type of construction, the sections may be formed with any desired shell division. Thus, in the case of the half-barrel type of construction, a parting plane may run between an upper shell and a lower shell, for example, even diagonally or in another way.

All the technical outfitting systems, in particular the hydraulic lines, the air-conditioning lines, the supply-air and spent-air lines and the sewage and fresh-water lines, may have at least partially a carrying function for underpinning the structure of the fuselage cell.

The method according to the invention may also be employed advantageously in the case of "monocoque" or closed fuselage sections having preferably larger length dimensions, in which case, for example, a fully pre-outfitted floor grid is introduced from an open side of the fuselage section, already connected to form a closed barrel, into the said fuselage section. In this case, corresponding manufacturing aids, for example presenting frames, holding devices or the like, are required for introducing the floor grid into the fuselage section.

Fuselage sections of this type which are not composed at least of two or more shell parts are produced, for example, in one piece by the winding method (for example, with a carbon-fibre-reinforced plastic) or by bending or rolling together large-format panel portions (for example, aluminium sheets), the panels subsequently being connected in the region of their two longitudinal sides by means of a longitudinal seam so as to form a closed fuselage section.

LIST OF REFERENCE SYMBOLS

1 Technical outfitting system
2 Technical outfitting system
3 Technical outfitting system
4 Upper shell
5 Mounting
6 Mounting
7 Base
8 Work platform
9 Employee
10 Technical outfitting system
11 Technical outfitting system
12 Technical outfitting system
13 Floor grid
14 Mounting
15 Employee
16 Work platform
17 Lifting platform
18 Coordinate system
19 Base
20 Lower shell
21 Carrying structure
22 Technical outfitting system
23 Technical outfitting system
24 Technical outfitting system
25 Lower region
26 Bottom scaffold
27 Work platform
28 Coordinate system
29 Employee
30 Carrying scaffold
31 Base
32 Fuselage section
33 Arrow
34 Arrow
35 Longitudinal seam
36 Longitudinal seam
37 Longitudinal seam
38 Longitudinal seam
39 Longitudinal seam
40 Longitudinal seam
41 Floor grid
42 Edge region
43 Edge region
44 Floor supporting bar
45 Floor supporting bar
46 Technical outfitting system
47 Technical outfitting system
48 Technical outfitting system
49 Lifting platform
50 Employee
51 Arrow
52 Top side (floor grid)
53 Support
54 Support
55 Underside (floor grid)
56 Lifting device
57 Arrow
58 Lower shell
59 Cargo floor
60 Technical outfitting system

The invention claimed is:

1. A method for producing a fuselage cell of an aircraft by integrated outfitting and structural assembly with at least one fuselage section, the fuselage section being formed by at least one shell having an upper shell and a lower shell, and at least one floor grid, the method comprising the following steps:
at least partial production of surface protection and thermal insulation in the region of the at least one shell part,
at least partial introduction of technical outfitting systems into the at least one shell part and/or the at least one floor grid and
assembly of the at least one shell part and of the at least one floor grid into the at least one fuselage section, wherein a cargo floor is introduced at least partially into a lower shell before the introduction of the at least one floor grid.

2. The method according to claim 1, wherein the at least one fuselage section has a length of at most 30 m.

3. The method according to claim 1, wherein, to complete the fuselage assembly, at least one fuselage portion of the aircraft is formed by at least one fuselage section, the fuselage cell of the aircraft having at least one fuselage portion.

4. The method according to claim 3, wherein a front, middle and rear fuselage portion are formed by the at least one fuselage section.

5. The method according to claim 1, wherein the surface protection is carried out at least partially before the assembly of the at least one shell part and of the at least one floor grid into a fuselage section.

6. The method according to claim 1, wherein the surface protection is completed during the introduction of the technical outfitting systems or during the assembly of the at least one fuselage section or during the completion of the fuselage assembly.

7. The method according to claim 1, wherein the technical outfitting systems are completed after the assembly of the at least one shell part and of the at least one floor grid.

8. The method according to claim 1, wherein the fuselage section is formed by four shell parts and by the at least one floor grid.

9. The method according to claim 8, wherein the fuselage section is formed by the lower shell, by two side shells, and by the upper shell.

10. The method according to claim 1, wherein the fuselage section is formed by two shell parts and by the at least one floor grid.

11. The method according to claim 1, wherein the fuselage section is formed by the lower shell and by the upper shell.

12. The method according to claim 1, wherein the technical outfitting systems include at least one of electrical and hydraulic lines, air-conditioning lines, electrical appliances, hydraulic appliances, sanitary equipment and catering equipment.

* * * * *